United States Patent
Long et al.

(10) Patent No.: US 11,424,518 B2
(45) Date of Patent: Aug. 23, 2022

(54) CYLINDRICAL LITHIUM BATTERY HAVING A POSITIVE POLE AND A NEGATIVE POLE AT THE SAME END

(71) Applicant: Dongguan Angyue Electronic Co., Ltd, Guangdong (CN)

(72) Inventors: Cheng Long, Guangdong (CN); Peizhi Fan, Guangdong (CN)

(*) Notice: Subject to any disclaimer, the term of this patent is extended or adjusted under 35 U.S.C. 154(b) by 197 days.

(21) Appl. No.: 16/931,537

(22) Filed: Jul. 17, 2020

(65) Prior Publication Data
US 2020/0350551 A1 Nov. 5, 2020

Related U.S. Application Data

(63) Continuation-in-part of application No. PCT/CN2018/104159, filed on Sep. 5, 2018.

(30) Foreign Application Priority Data

Jan. 22, 2018 (CN) .......................... 201820102710.9

(51) Int. Cl.
| | |
|---|---|
| *H01M 50/572* | (2021.01) |
| *H01M 10/058* | (2010.01) |
| *H01M 10/46* | (2006.01) |
| *H01M 50/545* | (2021.01) |
| *H01M 10/052* | (2010.01) |
| *H02J 7/00* | (2006.01) |

(52) U.S. Cl.
CPC ....... *H01M 50/572* (2021.01); *H01M 10/058* (2013.01); *H01M 10/46* (2013.01); *H01M 50/545* (2021.01); *H01M 10/052* (2013.01); *H02J 7/00* (2013.01)

(58) Field of Classification Search
CPC ............ H01M 50/572; H01M 50/545; H01M 10/058; H01M 10/46; H01M 10/52; H02J 7/00
USPC .......................................... 320/107, 112, 113
See application file for complete search history.

(56) References Cited

U.S. PATENT DOCUMENTS

| | | | |
|---|---|---|---|
| 7,879,477 B2* | 2/2011 | Seo | H01M 50/209 429/61 |
| 2017/0025665 A1* | 1/2017 | Li | H01M 50/578 |

(Continued)

FOREIGN PATENT DOCUMENTS

| | | | | |
|---|---|---|---|---|
| CN | 204792989 U | * | 11/2015 | ............ Y02E 60/10 |
| CN | 105811525 A | * | 7/2016 | |
| CN | 107302237 A | * | 10/2017 | |

(Continued)

*Primary Examiner* — Phallaka Kik
(74) *Attorney, Agent, or Firm* — Prakash Nama; Global IP Services, PLLC

(57) ABSTRACT

A cylindrical lithium battery having a positive pole and a negative pole at the same end, including a shell, a core in the shell, a cover and a recharging protection assembly mounted on top of the positive pole of the core, and is covered and fixed by the cover; the recharging protection assembly has an upper frame, a recharging protection panel, a lower frame, a positive pole nickel plate and a negative pole nickel plate; the recharging protection panel is disposed on the lower frame; a top surface of the recharging protection panel is welded with a gold-plated copper cap; one side of the recharging protection panel is provided with a USB charging port.

13 Claims, 4 Drawing Sheets

(56) References Cited

U.S. PATENT DOCUMENTS

| | | | |
|---|---|---|---|
| 2017/0237059 A1* | 8/2017 | Li | H01M 50/543 |
| | | | 429/61 |
| 2019/0245192 A1* | 8/2019 | Song | H01H 71/14 |

FOREIGN PATENT DOCUMENTS

| | | | | |
|---|---|---|---|---|
| CN | 206585027 U | * | 10/2017 | |
| CN | 107951153 A | * | 4/2018 | |
| CN | 108092077 A | * | 5/2018 | ........... H01R 13/631 |
| CN | 108428827 A | * | 8/2018 | .......... H01M 50/147 |
| CN | 108777507 A | * | 11/2018 | ............ H02J 7/0031 |
| CN | 208208837 U | * | 12/2018 | |
| CN | 105915671 B | * | 4/2019 | ............ H02J 7/0044 |
| CN | 110138025 A | * | 8/2019 | ................ B65F 1/14 |
| CN | 111009680 A | * | 4/2020 | |
| CN | 111049216 A | * | 4/2020 | .......... H01R 4/4863 |
| CN | 111064251 A | * | 4/2020 | ............ H01M 10/44 |
| CN | 111129574 A | * | 5/2020 | ........ H01M 10/0422 |
| EP | 1804328 A1 | * | 7/2007 | ........... H01M 10/052 |
| EP | 2905821 B1 | * | 11/2019 | ....... H01M 10/4257 |
| KR | 20140001926 U | * | 4/2014 | ......... H01M 10/425 |
| KR | 1442670 B1 | * | 9/2014 | ............ A42B 3/044 |
| KR | 101750480 B1 | * | 6/2017 | ......... H01M 10/425 |
| KR | 101750486 B1 | * | 6/2017 | ......... H01M 10/425 |
| KR | 101794942 B1 | * | 11/2017 | ......... H01M 10/052 |
| WO | WO-2019192302 A1 | * | 10/2019 | ......... H01M 10/425 |

* cited by examiner

CYLINDRICAL LITHIUM BATTERY HAVING A POSITIVE POLE AND A NEGATIVE POLE AT THE SAME END

BACKGROUND OF THE INVENTION

The present invention relates to the technical field of batteries, and more specifically relates to a cylindrical lithium battery having a positive pole and a negative pole at the same end.

A conventional negative pole protection device in a rechargeable cylindrical battery has the same working principle as a mobile phone battery cell, wherein the negative pole protection device comprises a negative pole and a protection panel, and a nickel strip is used to connect with the negative pole, and a specific charger has to be used for charging. However, prior art as such is difficult to control the product size, and the resulting product has a coarse appearance and poor reliability. A very few companies are able to reach an up-to-standard product yield rate of more than 80%.

The inventor of the present invention has developed a kind of structure that disposes the protection panel at the positive pole, and uses a steel cover and plastic frames for fixation. Also, a USB charging circuit is applied to the battery so that the battery can be recharged by connecting it with a mobile phone charger with a charging cable. The present invention can ensure product size, improve product outer appearance, increase product reliability and safety, and also lower the cost of using the product and enhance the convenience of charging the product.

BRIEF SUMMARY OF THE INVENTION

In view of the aforesaid disadvantages now present in the prior art, the present invention provides a cylindrical lithium battery having a positive pole and a negative pole at the same end to effectively solve the problems now existing in the prior art.

To fulfil the above object, the present invention has the following technical solutions:

A cylindrical lithium battery having a positive pole and a negative pole at the same end, comprising an outer shell, a cylindrical battery core, a steel cover and a recharging protection assembly; the cylindrical battery core is disposed inside the outer shell; the recharging protection assembly is mounted on top of the positive pole of the cylindrical battery core, and is covered and fixed by the steel cover; the recharging protection assembly comprises a plastic upper frame, a recharging protection panel, a plastic lower frame, a positive pole nickel plate and a negative pole nickel plate, wherein the plastic lower frame is mounted on the cylindrical battery core; two sides of the plastic lower frame are provided with locking grooves respectively; the recharging protection panel is disposed on the plastic lower frame; a top surface of the recharging protection panel is welded with a gold-plated copper cap; one side of the recharging protection panel is provided with a USB charging port; two sides of the plastic upper frame are provided with locking blocks respectively; the locking blocks engage with the corresponding locking grooves; after the gold-plated copper cap, the recharging protection panel, the positive pole nickel plate and the negative pole nickel plate are mounted on the plastic lower frame, the gold-plated copper cap, the recharging protection panel, the positive pole nickel plate and the negative pole nickel plate are covered by the plastic upper frame.

Preferably, the recharging protection assembly comprises a positive pole insulation plastic cover, the recharging protection panel, the positive pole nickel plate, the negative pole nickel plate and the plastic lower frame; the top surface of the recharging protection panel is welded with the gold-plated copper cap; the gold-plated copper cap is connected with the positive pole of the cylindrical battery core; one side of the recharging protection panel is welded with the USB charging port; the positive pole insulation plastic cover, the recharging protection panel, the positive pole nickel plate, the negative pole nickel plate and the plastic lower frame are provided on the positive pole of the cylindrical battery core, and are covered and fixed by the steel cover; an inner side of the steel cover is electrically connected with the negative pole of the cylindrical battery core, so that a surface of the steel cover defines a second negative pole.

Preferably, the recharging protection assembly comprises a positive pole insulation plastic cover, the recharging protection panel, the positive pole nickel plate, the negative pole nickel plate and the plastic lower frame; the top surface of the recharging protection panel is welded with the gold-plated copper cap; the gold-plated copper cap is connected with the positive pole of the cylindrical battery core; the positive pole insulation plastic cover, the recharging protection panel, the positive pole nickel plate and the plastic lower frame are provided on the positive pole of the cylindrical battery core, and are covered and fixed by the steel cover; an inner side of the steel cover is electrically connected with the negative pole of the cylindrical battery core, so that a surface of the steel cover defines a second negative pole.

Preferably, the positive pole nickel plate and the negative pole nickel plate are welded and fixed on a bottom surface of the recharging protection panel, and are also welded to the positive pole and the negative pole of the cylindrical battery core respectively.

Preferably, mounting openings corresponding to the USB charging port are provided on the steel cover and the outer shell at positions corresponding to the USB charging port.

Preferably, the outer shell is a polyethylene terephthalate (PET) shell.

Preferably, the steel cover and the positive insulation plastic cover are each provided at a central part thereof with an opening, to define a central hole to let the gold-plated copper cap pass through; an insulation plastic ring is provided around an inner periphery of the central hole and protruding upwardly out of the central hole; after the steel cover and the positive pole insulation plastic cover are mounted onto the positive pole of the cylindrical battery core, the gold-plated copper cap is exposed from an outer surface of the steel cover.

The gold-plated copper cap of the present invention is a positive pole conduction cap. Besides gold plating, the copper cap can also be plated with nickel.

The present invention has the following beneficial effects: The present invention has a simple structure and is reliable and highly practical. By using a steel cover and plastic frames of high precision, product size can be ensured to be highly consistent, also, the long nickel strip and the various auxiliary materials of the negative pole protection structure are no longer necessary, thereby lowering the cost and difficulty of production. As a result, the yield rate of up-to-standard products can be above 98%. Hence, the many disadvantages in conventional negative pole protection can be overcome. Also, by using a USB charging cable, the battery of the present invention can be connected to 95% of mobile chargers in the market to achieve battery recharging, and thereby lowering the cost of using the product and enhancing the convenience of recharging the battery.

DETAILED DESCRIPTION OF THE INVENTION

The present invention is described further in detail below with reference to some embodiments and the accompanying drawings.
FIGS. 1-4 illustrate the embodiments described below.

Embodiment 1

Figure 1:
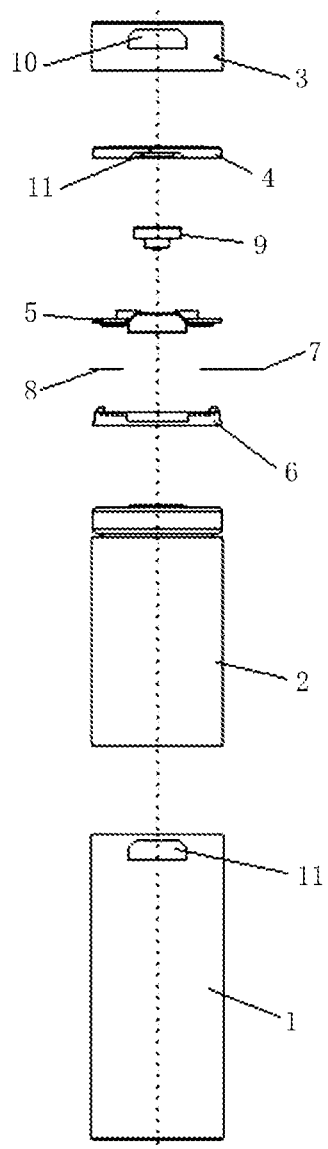
FIG. 1 is an exploded structural view according to embodiment 1 of the present invention.

With reference to FIG. 1, the present invention comprises an outer shell 1, a cylindrical battery core 2, a steel cover 3 and a recharging protection assembly; the cylindrical battery core 2 is disposed inside the outer shell 1; one end of the cylindrical battery core 2 is a positive pole 12; another end of the cylindrical battery core 2 is a negative pole 13; the recharging protection assembly is mounted on top of the positive pole 12 of the cylindrical battery core 2, and is covered and fixed by the steel cover 3; the recharging protection assembly comprises a plastic upper frame 4, a recharging protection panel 5, a plastic lower frame 6, a positive pole nickel plate 7 and a negative pole nickel plate 8, wherein the plastic lower frame 6 is mounted on the cylindrical battery core 2; two sides of the plastic lower frame 6 are provided with locking grooves respectively; the recharging protection panel 5 is disposed on the plastic lower frame 6; a top surface of the recharging protection panel 5 is welded with a gold-plated copper cap 9; one side of the recharging protection panel 5 is provided with a USB charging port 10; two sides of the plastic upper frame 4 are provided with locking blocks respectively; the locking blocks engage with the corresponding locking grooves; after the gold-plated copper cap 9, the recharging protection panel 5, the positive pole nickel plate 7 and the negative pole nickel plate 8 are mounted on the plastic lower frame 6, the gold-plated copper cap 9, the recharging protection panel 5, the positive pole nickel plate 7 and the negative pole nickel plate 8 are covered by the plastic upper frame 4; the positive pole nickel plate 7 and the negative pole nickel plate 8 are welded and fixed to a bottom surface of the recharging protection panel 5, and are also welded to the negative pole 12 and the negative pole 13 of the cylindrical battery core 2 respectively; mounting openings 11 corresponding to the USB charging port 10 are provided on the steel cover 3 and the outer shell 1 at positions corresponding to the USB charging port 10; the outer shell 1 is a polyethylene terephthalate (PET) shell.

During assembly, the gold-plated copper cap 9 and the recharging protection panel 5 are welded together, and then the positive pole nickel plate 7 and the negative pole nickel plate 8 are spot welded to the recharging protection panel 5; and then the recharging protection panel and the components welded thereto are mounted with the plastic upper frame 4 and the plastic lower frame 6, and the positive pole nickel plate and the negative pole nickel plate are then spot welded to the positive pole 12 and the negative pole 13 of the cylindrical battery core 2; next, cover the steel cover 3 onto the cylindrical battery core 2, and ensure good contact between the steel cover 3 and the negative pole 13 of the cylindrical battery core 2; finally sleeve the cylindrical battery core and the steel cover by the outer shell 1 and fix the outer shell 1 on the cylindrical battery core and the steel cover by thermal shrinkage.

Embodiment 2

Figure 2:
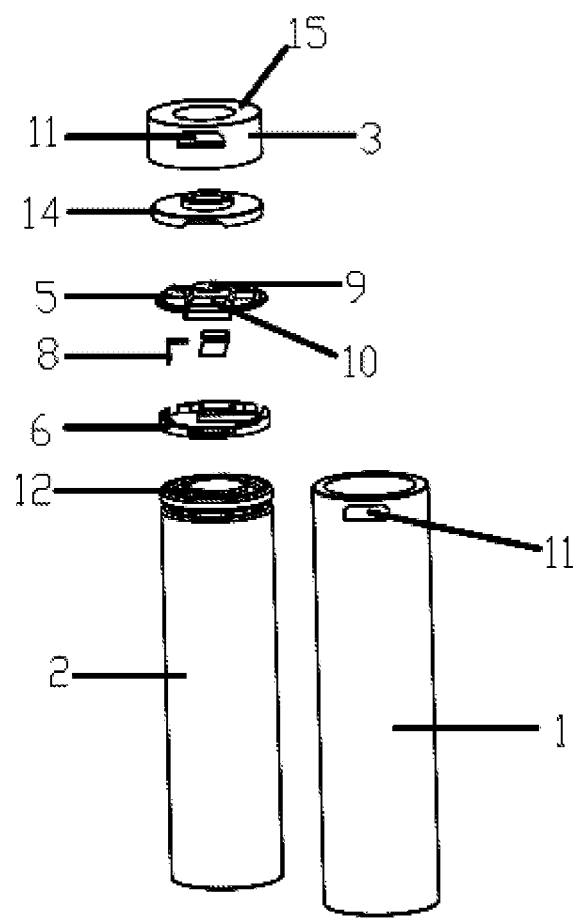
FIG. 2 is an exploded structural view according to embodiment 2 of the present invention.

As shown in FIG. 2, embodiment 2 is different from embodiment in that, the recharging protection assembly comprises a positive pole insulation plastic cover 14, a recharging protection panel 5, a positive pole nickel plate 7, a negative pole nickel plate 8 and a plastic lower frame 6; a top surface of the recharging protection panel 5 is welded with a gold-plated copper cap 9; the gold-plated copper cap 9 is connected with a positive pole 12 of the cylindrical battery core 2; one side of the recharging protection panel 5 is welded with a USB charging port 10; the positive pole insulation plastic cover 14, the recharging protection panel 5, the positive pole nickel plate 7, the negative pole nickel plate 8 and the plastic lower frame 6 are provided on the positive pole 12 of the cylindrical battery core 2, and are covered and fixed by a steel cover 3; an inner side of the steel cover 3 is electrically connected with a negative pole 13, so that a surface of the steel cover 3 defines a second negative pole 15; the positive pole nickel plate 7 and the negative pole nickel plate 8 are welded and fixed on a bottom surface of the recharging protection panel 5, and are also welded to the positive pole 12 and the negative pole 13 of the cylindrical battery core 2 respectively; mounting openings 11 corresponding to the USB charging port 10 are provided on the steel cover 3 and an outer shell 1 at positions corresponding to the USB charging port 10; the outer shell 1 is a polyethylene terephthalate (PET) shell, apart from that, the outer shell 1 can also be formed by thermal shrinkage of polyvinyl chloride (PVC). The steel cover 3 and the positive insulation plastic cover 14 are each provided at a central part thereof with an opening, to define a central hole to let the gold-plated copper cap 9 pass through; an insulation plastic ring is provided around an inner periphery of the central hole and protruding upwardly out of the central hole; after the steel cover 3 and the positive pole insulation plastic cover 14 are mounted onto the positive pole 12 of the cylindrical battery core 2, the gold-plated copper cap 9 is exposed from an outer surface of the steel cover 3.

According to the present embodiment, an additional negative pole (i.e. the second negative pole 15) is provided at the same end of the battery where the positive pole 12 is disposed, so that one end of the battery is the negative pole 13 while another end of the battery comprises both the positive pole 12 and the second negative pole 15. Accordingly, the battery has a wider scope of applications which solves the problem of battery use in a torch designed to have the positive pole and the negative pole at the same end. In other words, the present invention provides a wider scope of applications in that the battery of the present invention can be used in a torch designed to have the positive pole and the negative pole at the same end, and it can also be used in a conventional torch. A battery having the end of the positive pole 12 also configured to comprise a negative pole can significantly simplify the design and save the cost of configuring a recharging and discharging management circuit in the equipment concerned. By configuring the USB charging port at one side of the positive pole 12, the cost of providing a hardware charger to charge the battery is saved since the battery can be recharged by using a power cable to connect with an external power source. By configuring the entire recharging protection assembly on the positive pole 12, protection is enhanced in case of short circuit or any abnormal situation, thereby solving the disadvantages of using nickel strip and the problem of short circuit in conventional negative pole protection.

Embodiment 3

Figure 3:
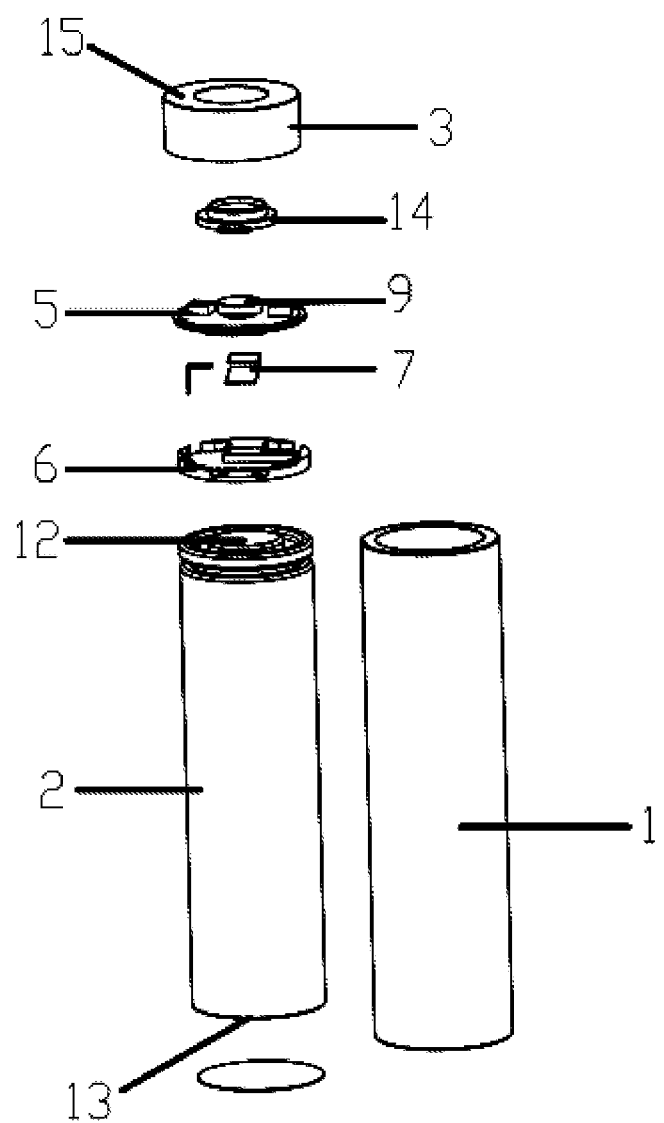
FIG. 3 is an exploded structural view according to embodiment 3 of the present invention.
Figure 4:
FIG. 4 is a perspective structural view according to embodiment 3 of the present invention.
In the figures: 1—outer shell; 2—cylindrical battery core; 3—steel cover; 4—plastic upper frame; 5—recharging protection panel; 6—plastic lower frame; 7—positive pole nickel plate; 8—negative pole nickel plate; 9—gold—plated copper cap; 10—USB charging port; 11—mounting openings; 12—positive pole; 13—negative pole; 14—positive pole insulation plastic cover; 15—second negative pole.

As shown in FIGS. 3-4, embodiment 3 is different from embodiment 1 and embodiment 2 in that, the recharging protection assembly comprises a positive pole insulation plastic cover 14, a recharging protection panel 5, a positive pole nickel plate 7, a negative pole nickel plate 8 and a plastic lower frame 6; a top surface of the recharging protection panel 5 is welded with a gold-plated copper cap 9; the gold-plated copper cap 9 is connected with a positive pole 12 of a cylindrical battery core 2; the positive pole insulation plastic cover 14, the recharging protection panel 5, the positive pole nickel plate 7, the negative pole nickel plate 8 and the plastic lower frame 6 are provided on the positive pole 12 of the cylindrical battery core 2, and are covered and fixed by a steel cover 3; an inner side of the steel cover 3 is electrically connected with a negative pole 13, so that a surface of the steel cover 3 defines a second negative pole 15; the positive pole nickel plate 7 and the negative pole nickel plate 8 are welded and fixed on a bottom surface of the recharging protection panel 5, and are also welded to the positive pole 12 and the negative pole 13 of the cylindrical battery core 2 respectively; the outer shell 1 is a polyethylene terephthalate (PET) shell, apart from that, the outer shell 1 can also be formed by thermal shrinkage of polyvinyl chloride (PVC). The steel cover 3 and the positive insulation plastic cover 14 are each provided at a central part thereof with an opening, to define a central hole to let the gold-plated copper cap 9 pass through; an insulation plastic ring is provided around an inner periphery of the central hole and protruding upwardly out of the central hole; after the steel cover 3 and the positive pole insulation plastic cover 14 are mounted onto the positive pole 12 of the cylindrical battery core 2, the gold-plated copper cap 9 is exposed from an outer surface of the steel cover 3.

According to the present embodiment, an additional negative pole (i.e. the second negative pole 15) is provided at the same end of the battery where the positive pole 12 is disposed, so that one end of the battery is the negative pole 13 while another end of the battery comprises both the positive pole 12 and the second negative pole 15. Accordingly, the battery has a wider scope of applications which solves the problem of battery use in a torch designed to have the positive pole and the negative pole at the same end. In other words, the present invention provides a wider scope of applications in that the battery of the present invention can be used in a torch designed to have the positive pole and the negative pole at the same end, and it can also be used in a conventional torch. By configuring the entire recharging protection assembly on the positive pole 12, protection is enhanced in case of short circuit or any abnormal situation, thereby solving the disadvantages of using nickel strip and the problem of short circuit in conventional negative pole protection.

It should be noted that, one end of the cylindrical battery core 2 is configured with the conventional negative pole 13, and another end of the cylindrical battery core 2 is provided with the positive pole 12. Since the entire outer wall of the cylindrical battery core 2 and the negative pole 13 are formed integrally (such that the entire outer wall of the cylindrical battery core 2 is the negative pole 13 of the battery), after the steel cover 3 and the positive pole insulation plastic cover 14 are mounted onto the positive pole 12 of the cylindrical battery core 2, the insulation plastic ring in the central hole will surround the gold-plated copper cap 9 such that the gold-plated copper cap 9 is insulated from the steel cover 3. The inner side of the steel cover 3 is electrically connected with the outer wall of the cylindrical battery core 2, and then the outer shell 1 is provided to sleeve both the steel cover 3 and the cylindrical battery core 2, and the outer shell 1 is fixed by thermal shrinkage. As such, a surface of the steel cover 3 defines a second negative pole 15 of the battery.

The present invention is described in further detail above with reference to specific preferred embodiments. However, the present invention should not be limited only to the embodiments as described above. A person skilled in this field of art should know that, simple modifications or alternative configurations are possible if they do not deviate from the inventive concept of the present invention, and they should also be considered falling within the scope of protection of the present invention.

What is claimed is:

1. A cylindrical lithium battery having a positive pole and a negative pole at the same end, comprising an outer shell, a cylindrical battery core, a steel cover and a recharging protection assembly; the cylindrical battery core is disposed inside the outer shell; the recharging protection assembly is mounted on top of the positive pole of the cylindrical battery core, and is covered and fixed by the steel cover; the recharging protection assembly comprises a plastic upper frame, a recharging protection panel, a plastic lower frame, a positive pole nickel plate and a negative pole nickel plate, wherein the plastic lower frame is mounted on the cylindrical battery core; two sides of the plastic lower frame are provided with locking grooves respectively; the recharging protection panel is disposed on the plastic lower frame; a top surface of the recharging protection panel is welded with a gold-plated copper cap; one side of the recharging protection panel is provided with a USB charging port; two sides of the plastic upper frame are provided with locking blocks respectively; the locking blocks engage with the corresponding locking grooves; after the gold-plated copper cap, the recharging protection panel, the positive pole nickel plate and the negative pole nickel plate are mounted on the plastic lower frame, the gold-plated copper cap, the recharging protection panel, the positive pole nickel plate and the negative pole nickel plate are covered by the plastic upper frame.

2. The cylindrical lithium battery of claim 1, wherein the recharging protection assembly comprises a positive pole insulation plastic cover, the recharging protection panel, the positive pole nickel plate, the negative pole nickel plate and the plastic lower frame; the top surface of the recharging protection panel is welded with the gold-plated copper cap; the gold-plated copper cap is connected with the positive pole of the cylindrical battery core; one side of the recharging protection panel is welded with the USB charging port; the positive pole insulation plastic cover, the recharging protection panel, the positive pole nickel plate, the negative pole nickel plate and the plastic lower frame are provided on the positive pole of the cylindrical battery core, and are covered and fixed by the steel cover; an inner side of the steel cover is electrically connected with the negative pole of the cylindrical battery core, so that a surface of the steel cover defines a second negative pole.

3. The cylindrical lithium battery of claim 2, wherein the positive pole nickel plate and the negative pole nickel plate are welded and fixed on a bottom surface of the recharging protection panel, and are also welded to the positive pole and the negative pole of the cylindrical battery core respectively.

4. The cylindrical lithium battery of claim 2, wherein mounting openings corresponding to the USB charging port are provided on the steel cover and the outer shell at positions corresponding to the USB charging port.

5. The cylindrical lithium battery of claim 2, wherein the outer shell is a polyethylene terephthalate (PET) shell.

6. The cylindrical lithium battery of claim 2, wherein the steel cover and the positive insulation plastic cover are each provided at a central part thereof with an opening, to define a central hole to let the gold-plated copper cap pass through; an insulation plastic ring is provided around an inner periphery of the central hole and protruding upwardly out of the central hole; after the steel cover and the positive pole insulation plastic cover are mounted onto the positive pole of the cylindrical battery core, the gold-plated copper cap is exposed from an outer surface of the steel cover.

7. The cylindrical lithium battery of claim 1, wherein the recharging protection assembly comprises a positive pole insulation plastic cover, the recharging protection panel, the positive pole nickel plate, the negative pole nickel plate and the plastic lower frame; the top surface of the recharging protection panel is welded with the gold-plated copper cap; the gold-plated copper cap is connected with the positive pole of the cylindrical battery core; the positive pole insulation plastic cover, the recharging protection panel, the positive pole nickel plate, the negative pole nickel plate and the plastic lower frame are provided on the positive pole of the cylindrical battery core, and are covered and fixed by the steel cover; an inner side of the steel cover is electrically connected with the negative pole of the cylindrical battery core, so that a surface of the steel cover defines a second negative pole.

8. The cylindrical lithium battery of claim 7, wherein the positive pole nickel plate and the negative pole nickel plate are welded and fixed on a bottom surface of the recharging protection panel, and are also welded to the positive pole and the negative pole of the cylindrical battery core respectively.

9. The cylindrical lithium battery of claim 7, wherein the outer shell is a polyethylene terephthalate (PET) shell.

10. The cylindrical lithium battery of claim 7, wherein the steel cover and the positive insulation plastic cover are each provided at a central part thereof with an opening, to define a central hole to let the gold-plated copper cap pass through; an insulation plastic ring is provided around an inner periphery of the central hole and protruding upwardly out of the central hole; after the steel cover and the positive pole insulation plastic cover are mounted onto the positive pole of the cylindrical battery core, the gold-plated copper cap is exposed from an outer surface of the steel cover.

11. The cylindrical lithium battery of claim 1, wherein the positive pole nickel plate and the negative pole nickel plate are welded and fixed on a bottom surface of the recharging protection panel, and are also welded to the positive pole and the negative pole of the cylindrical battery core respectively.

12. The cylindrical lithium battery of claim 1, wherein mounting openings corresponding to the USB charging port are provided on the steel cover and the outer shell at positions corresponding to the USB charging port.

13. The cylindrical lithium battery of claim 1, wherein the outer shell is a polyethylene terephthalate (PET) shell.

\* \* \* \* \*